No. 682,917. Patented Sept. 17, 1901.
J. M. DOAN.
TIRE.
(Application filed July 20, 1901.)
(No Model.)
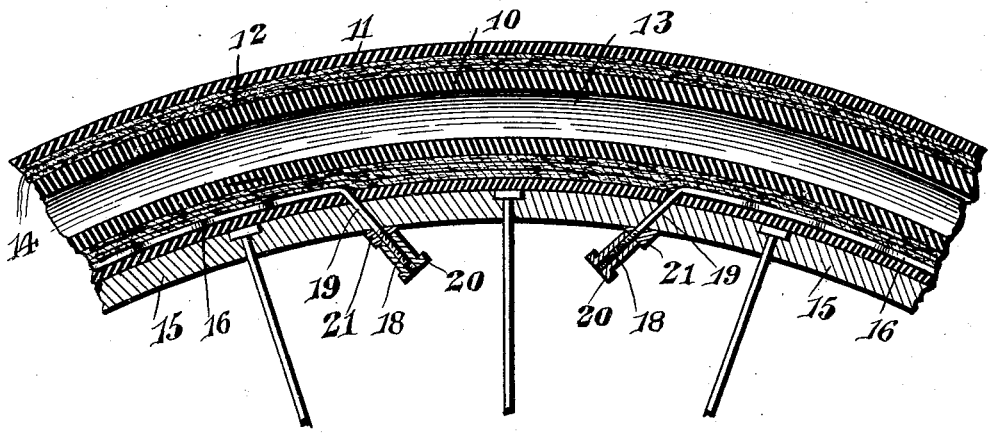
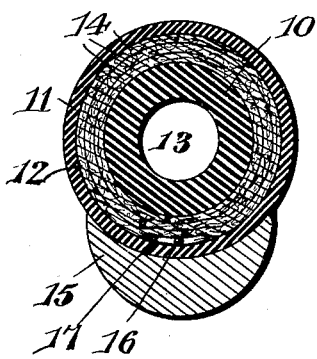
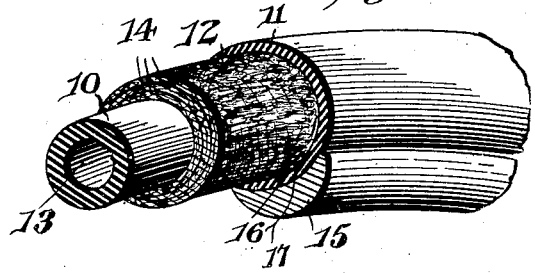
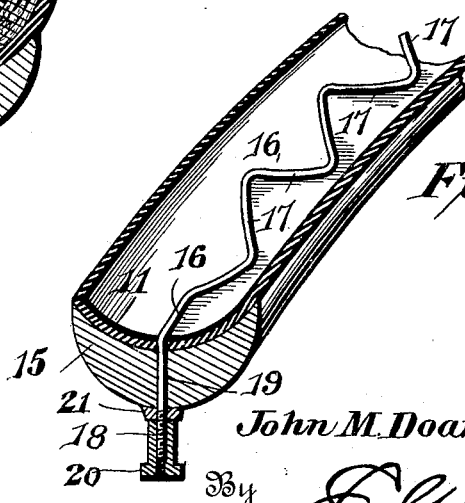
John M. Doan, Inventor
Witnesses

UNITED STATES PATENT OFFICE.

JOHN M. DOAN, OF MISHAWAKA, INDIANA, ASSIGNOR OF ONE-HALF TO EDWARD W. SYNWOLT, OF SAME PLACE.

TIRE.

SPECIFICATION forming part of Letters Patent No. 682,917, dated September 17, 1901.

Application filed July 20, 1901. Serial No. 69,096. (No model.)

*To all whom it may concern:*

Be it known that I, JOHN M. DOAN, a citizen of the United States, residing at Mishawaka, in the county of St. Joseph and State of Indiana, have invented a new and useful Tire, of which the following is a specification.

The present invention relates to elastic tires, and more especially to that class known as "cushion-tires."

The object of the present invention is to improve tires of this character by providing a structure that will retain its elasticity under all conditions.

In a former patent, No. 618,836, dated February 7, 1899, there is described and claimed a structure consisting, broadly, of an inner and outer tube having an interposed fibrous filling. This inner tube is comparatively thin and is filled with strands that serve to hold the tube distended. In actual practice, however, it has been found that the filling of the inner tube becomes flattened by the continual pressure exerted upon it, and as a consequence the entire tire assumes an ovoidal or partly-collapsed condition, so that much of the resiliency is lost. The present invention is designed to overcome this very serious defect by providing a structure that will hold its proper cross-sectional contour for an indefinite period and at the same time be secure against punctures or similar accidents. To this end a comparatively heavy core or body is formed of soft rubber and is provided with a freely open passage-way therethrough. This body is of sufficient strength and thickness to reassume its proper shape when pressed therefrom, and a layer of soft fibrous material surrounds the same, this material being in turn incased in an outer sheathing of soft rubber. By this means the thin inner tube, with its filling, is done away with and the fibrous material is completely protected from the moisture or other deleterious influences.

A further feature of the invention resides in a novel tire-fastening device which is very simple in construction, provides a broad bearing-surface to hold all adjacent portions of the tire upon the rim, and provides means whereby the tire can be easily attached and detached from said rim. While this device is shown in connection with the improved tire, it will be readily apparent that it may be employed in connection with pneumatic tires or those of other classes.

The construction at present considered preferable is illustrated in the accompanying drawings and described in the following specification. Such slight changes may be made therefrom, however, as are within the scope of the appended claims.

In the drawings, Figure 1 is a longitudinal sectional view of a portion of a tire embodying the present improvements. Fig. 2 is a cross-sectional view of the same. Fig. 3 is a detail perspective view of a portion of the tire. Fig. 4 is a detail perspective view more clearly illustrating the construction and application of the holding device.

Similar numerals of reference designate corresponding parts in all the figures of the drawings.

The tire consists of three elements—an inner body 10, an outer sheathing 11, and an interposed filling 12. The body 10 is circular in cross-section and is made of soft rubber. It is provided with a central longitudinally-disposed passage-way 13, and the walls are comparatively thick and heavy, constituting a self-sustaining core which will not collapse, but have sufficient resiliency. The sheathing 11 is in the form of a flexible rubber tube that surrounds the body 10, but is spaced from the same, and in said space is placed the filling 12. This filling consists of fibrous material, preferably layers 14 of felt wrapped about the body, each layer being entirely independent of the other. The filling completely fills the space, and thus forms an interposed packing that is soft and pliable, but which will transmit the pressure from the outer casing to the inner body.

In connection with the above-described tire there is employed means for fastening the same to the rim or felly 15. This means is in the form of a wire 16, that is corrugated, as at 17, said corrugations extending transversely of the felly and preferably conforming to the curvature thereof. The ends of the wire are screw-threaded, as at 18, and pass through suitable openings 19 in the felly, said openings being spaced a slight distance apart. Nuts 20 are threaded upon the ends of the wire and are arranged to bear against suitable washers 21, located upon the exterior face of the felly or rim. The wire is passed through the tire between the outer sheathing and the filling, but is not attached to either. It will thus be seen that when the tire is placed in position upon the rim and the nuts 20 screwed home the wire will be drawn tightly within the outer sheathing and the transversely-arranged corrugations will secure a comparatively broad surface of the tire to the rim. At the same time because of said wire passing loosely through the tire sufficient play is allowed to the former to permit of its contraction when it is desired to remove the tire from the wheel. By this construction it will therefore be seen that a tire is provided which is both simple and inexpensive in construction. In actual use it has proved to not only have the desired resiliency, but also the power of retaining the same. This is due in great part to the soft and thick core or body and the interposed fibrous filling, which filling is completely protected from moisture, that tends to make it soggy and heavy. The fastening device embodies simple means whereby the tire may be easily attached to or detached from the wheel, and it will be readily understood that it can be applied to other kinds of tires than the one illustrated in the present case.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by means of Letters Patent, is—

1. In an elastic tire, a relatively heavy soft-rubber body having a longitudinally-disposed open passage-way therethrough constituting a self-sustaining core, an outer sheathing of flexible rubber, and a filler of soft fibrous material interposed between the heavy core or body and the outer sheathing, said filler being independent of and separate from the core and sheathing.

2. In an elastic tire, a relatively heavy soft-rubber body having a longitudinally-disposed open passage-way therethrough constituting a self-sustaining core, an outer sheathing of flexible rubber, and a plurality of independent layers of soft textile material interposed between the heavy core or body and the outer sheathing, said layers being free and separate from the core and sheathing and also from each other.

3. The combination with a rim and tire, of a fastening-wire located longitudinally within the tire and having its ends passing through and secured to the rim, said wire being provided with corrugations that extend transversely of the rim, and thus secure a comparatively broad surface of the tire to said rim.

4. The combination with a rim, of a tire comprising an inner and an outer casing, and a fastening-wire located longitudinally between the inner and outer casings of the tire and unattached thereto, said wire passing through and being secured to the rim, and being furthermore provided with corrugations that extend transversely of the rim and thus secure a comparatively broad surface of the tire to said rim.

5. The combination with a rim, of an elastic tire comprising a relatively heavy soft-rubber core or body having a longitudinally-disposed open passage-way therethrough, an outer sheathing of flexible rubber, and a layer of soft fibrous material interposed between the heavy core or body and the outer sheathing, of a fastening-wire located longitudinally within and bearing against the inner face of the outer sheathing, said wire passing through and being secured to the rim, and being furthermore provided with corrugations that extend transversely of the rim and thus secure a comparatively broad surface of the tire to said rim.

In testimony that I claim the foregoing as my own I have hereto affixed my signature in the presence of two witnesses.

JOHN M. DOAN.

Witnesses:
A. J. SCHINDLER,
JOHN J. SCHINDLER.